Figure 1:
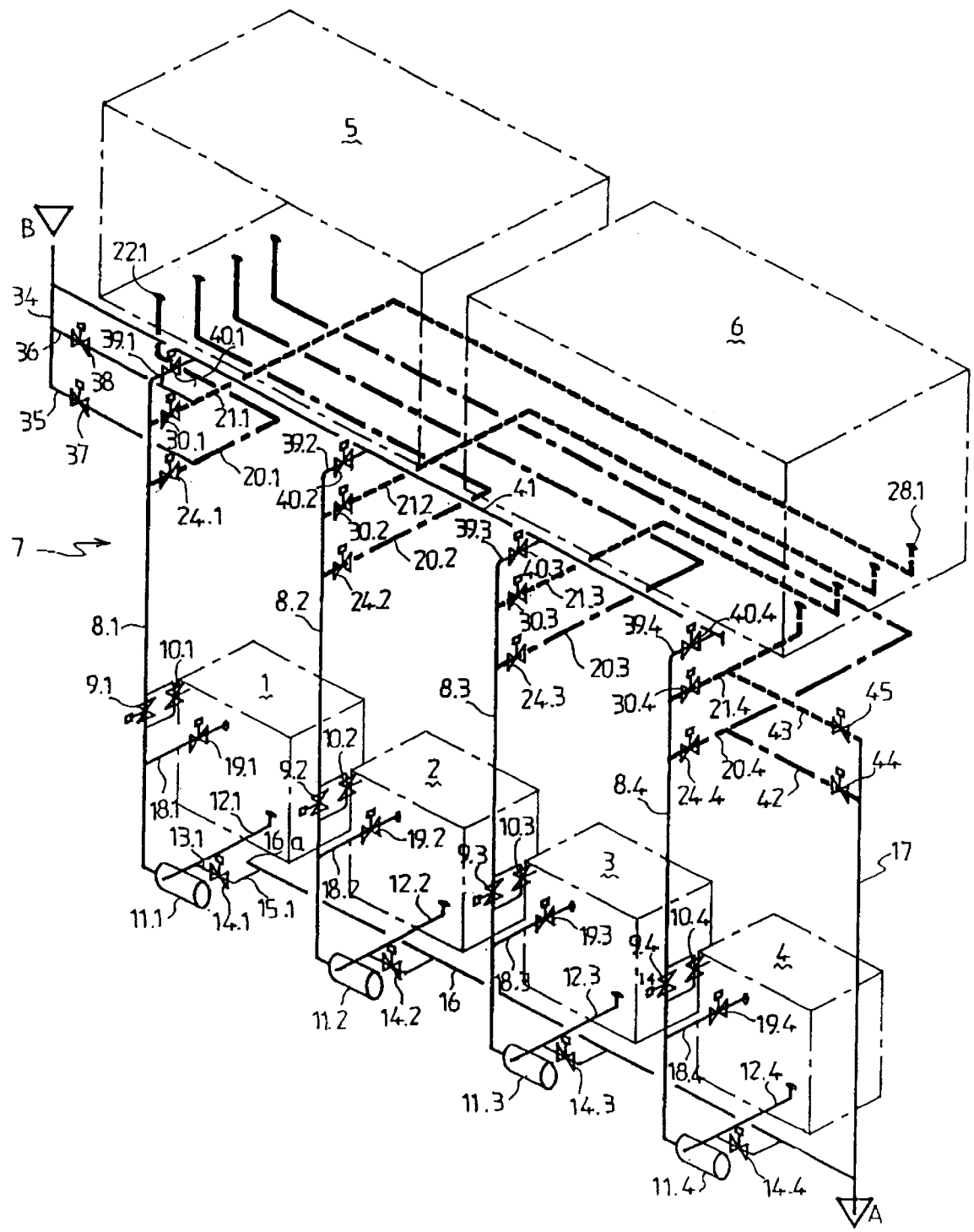

United States Patent [19]
Dreano

[11] Patent Number: 6,085,639
[45] Date of Patent: Jul. 11, 2000

[54] COOKING FACILITY

[75] Inventor: Claude Dreano, Mauron, France

[73] Assignee: Armor Inox SA, Mauron, France

[21] Appl. No.: 09/420,586

[22] Filed: Oct. 19, 1999

[30] Foreign Application Priority Data

Oct. 19, 1998 [FR] France ................................... 98 13179

[51] Int. Cl.$^7$ ............................. A47J 27/00; A47J 27/20; A47J 27/18; A23L 3/02
[52] U.S. Cl. ................................. 99/330; 99/355; 99/367; 99/448; 99/470; 165/48.1; 165/61; 62/82; 62/282
[58] Field of Search ...................... 99/325–330, 352–355, 99/402, 403, 359, 360, 416, 367–370, 470, 483, 516, 534; 426/506, 509, 520–524; 165/61, 104.14, 48.1, 232, 240; 62/82, 61, 282, 185

[56] References Cited

U.S. PATENT DOCUMENTS

| | | | |
|---|---|---|---|
| 1,485,133 | 2/1924 | White ........................................ | 99/330 |
| 1,927,043 | 9/1933 | Mullen ...................................... | 99/330 |
| 2,638,838 | 5/1953 | Talmey et al. ............................. | 99/355 |
| 3,796,144 | 3/1974 | Foldenauer et al. ...................... | 99/441 |
| 3,971,306 | 7/1976 | Wiese et al. ............................... | 99/353 |
| 3,983,259 | 9/1976 | Maior ........................................ | 99/368 |
| 4,088,444 | 5/1978 | Byrne ........................................ | 99/370 |
| 4,173,993 | 11/1979 | Skala . | |
| 4,188,794 | 2/1980 | Skala . | |
| 4,270,598 | 6/1981 | Britton . | |
| 4,505,192 | 3/1985 | Dreano ..................................... | 99/367 |
| 4,873,917 | 10/1989 | Sugimura et al. ..................... | 99/443 C |
| 5,005,471 | 4/1991 | Dreano . | |

FOREIGN PATENT DOCUMENTS 0 334 782   3/1989   European Pat. Off. .

Primary Examiner—Timothy Simone
Attorney, Agent, or Firm—Lowe Hauptman Gopstein Gilman & Berner, LLP.

[57] ABSTRACT

Foodstuffs are cooked by soaking in a hot liquid followed by a soaking in at least one cold liquid. A tank or a plurality of cooking tanks is provided with a liquid inlet, a heating unit for obtaining hot liquid, a refrigeration unit for obtaining cold liquid and filling pipes for conveying the liquids to the respective inlets of the tanks. The installation has reversible pumps, each designed to permit the liquids to flow in a tank in the direction of the inlet and to permit the liquid to return from the tank inlet, via one of the filling pipes and in the direction of the units.

14 Claims, 9 Drawing Sheets

COOKING FACILITY

The present invention concerns an installation for cooking foodstuffs by soaking in a hot liquid followed by a soaking in at least one cold liquid. More particularly, the invention concerns an installation including a plurality of cooking tanks, a heating unit for obtaining a hot liquid, a refrigeration unit for obtaining a refrigerated liquid, and a set of pipes for conveying the liquids.

An installation of this type is described in the European patent document EP-B-334 782. This installation is notably designed to make it possible to programme, in each tank, the cooking of the food stuffs which it contains, independently of the other tanks.

The said installation is such that the heating and refrigeration units are installed at a height appreciably greater than that of the cooking tanks, so as to leave sufficient space for a lifting machine, such as a pulley block, for hooking on and conveying the foodstuffs to be cooked into the tanks and cooked foodstuffs out of the said tanks.

In addition, to each heating or refrigeration unit there is connected a pipe for collecting the liquid to be heated or cooled, respectively, by means of an inlet on the said unit. To each unit there is also connected a pipe for distributing hot or liquid, according to circumstances, by means of an outlet on the said unit.

A down-pipe is provided to connect each liquid distribution pipe to the cooking tank down below, so as to feed the latter with hot or cold liquid. An up-pipe is also provided to connect each cooking tank to each of the said collecting pipes, by means of a pump whose discharge outlet is itself connected to the bottom of the said up-pipe.

The aim of the present invention is to propose a novel installation for cooking foodstuffs by soaking in a hot liquid followed by a soaking in at least one cold liquid, the said installation having a tank or a plurality of cooking tanks each provided with a liquid inlet, a heating unit containing a hot liquid, a refrigeration unit for obtaining a refrigerated liquid and filling pipes for conveying the said liquids to the respective inlets of the said tanks, which has a simple structure and consequently a reduced size.

To this end, an installation according to the invention has reversible pumps which are each designed on the one hand to permit the flow of the said liquids in a tank in the direction of the said inlet and on the other hand to permit the return of the said liquids from the said tank inlet, via one of the said filling tanks in the direction of the said units.

According to another characteristic of the invention, the said installation is of the type where each tank is provided with a liquid outlet above the said inlet, and is such that the said outlet is connected to the said corresponding filling and return pipe by a pipe provided with a solenoid valve.

According to another characteristic of the invention, in its part adjacent to the said units, each filling and return pipe is connected to each of the said units by means of two connecting pipes provided with solenoid valves, respectively.

According to another characteristic of the invention, the free ends of the said pipes connecting to the said heating unit and the free ends of the said pipes connecting to the said refrigeration unit are provided on the side of the said corresponding unit which is furthest away from the other units.

According to another characteristic of the invention, the said installation is of the type where it has a plurality of aligned tanks, and is such that the two connecting pipes relating to one of the end tanks are connected to the same pipe supplying liquid at ambient temperature, by means of two inlet pipes, respectively.

According to another characteristic of the invention, each inlet pipe connects a connecting pipe to the said supply pipe, between the corresponding solenoid valve and free end of the said connecting pipe, for supplying the said units.

According to another characteristic of the invention, the ends of the said filling and return pipes which are adjacent to the said units respectively provided with solenoid valves, and which are connected to the said supply pipe by a common pipe.

According to another characteristic of the invention, the said connecting pipes relating to the other end tank are connected to a discharge pipe by means of two outlet pipes, respectively.

According to another characteristic of the invention, each outlet pipe connects a connecting pipe to the said discharge pipe, between the corresponding solenoid valve and the free end of the said connecting pipe.

According to another characteristic of the invention, each filling and return pipe is provided with two solenoid valves mounted in parallel, one of the said solenoid valves being of the flow rate regulation type.

According to another characteristic of the invention, the said heating and refrigeration units are installed at a height appreciably greater than that of each cooking tank.

Figure 2:
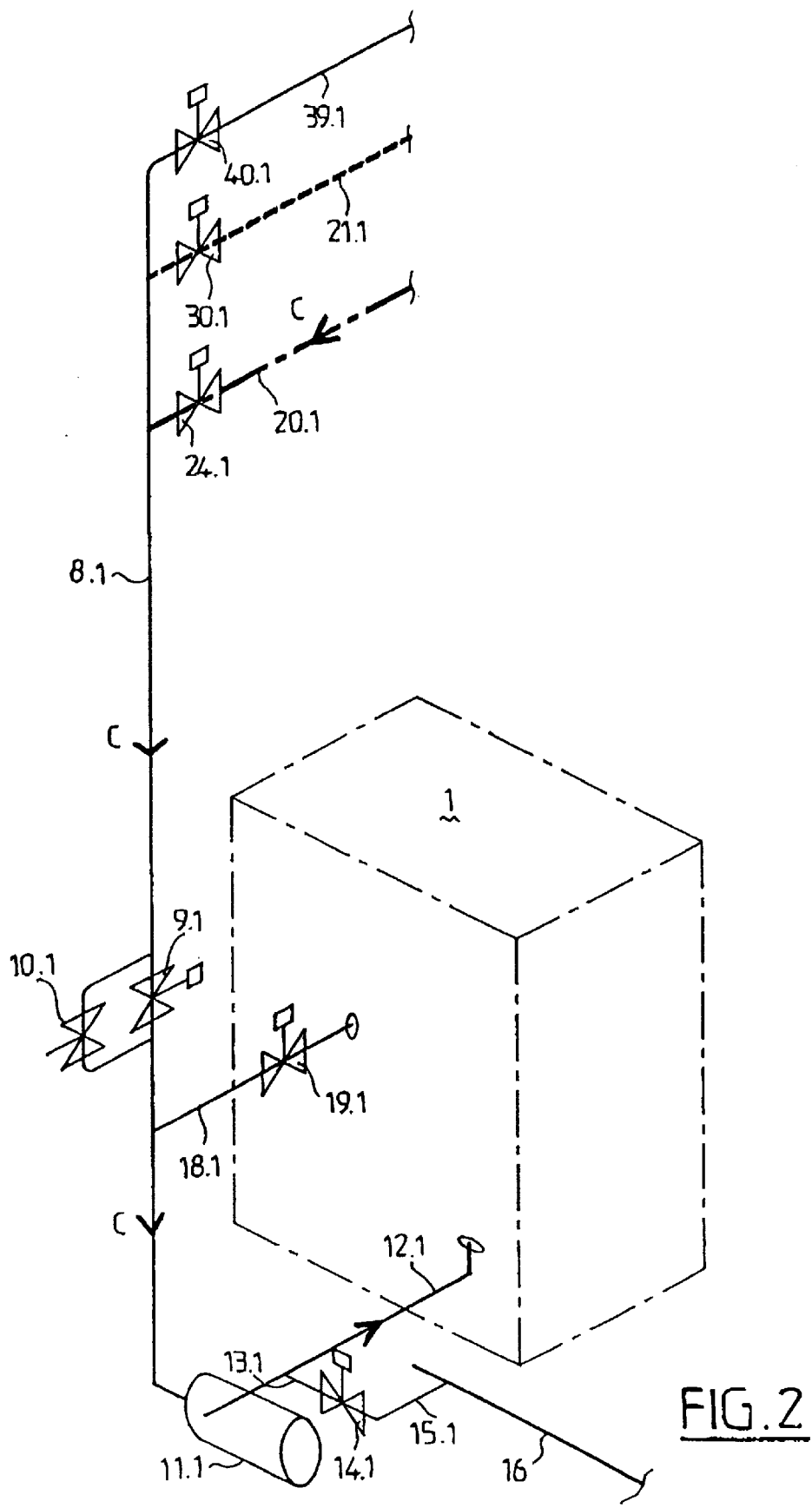
Figure 3:
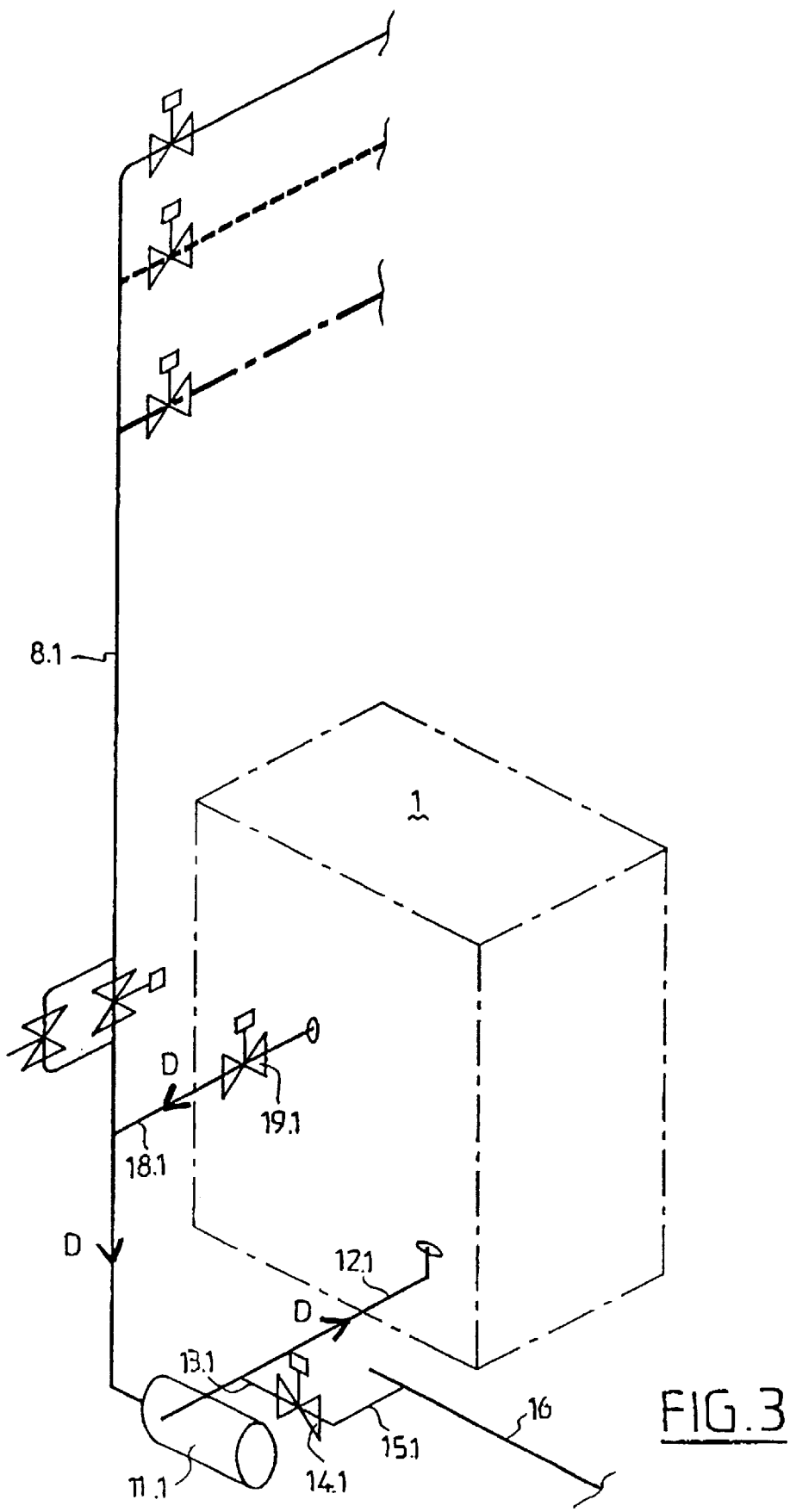
Figure 4:
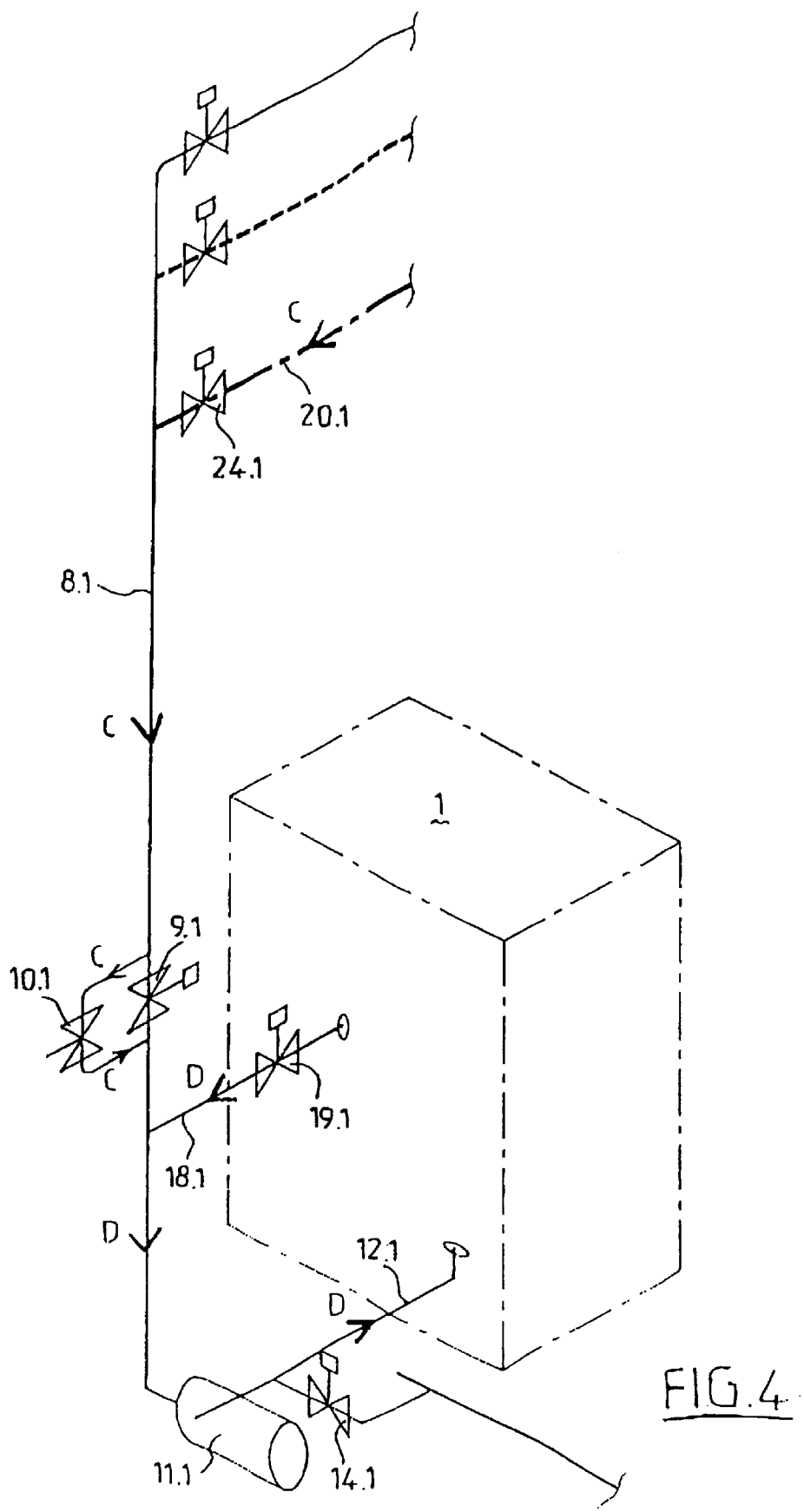
Figure 5:
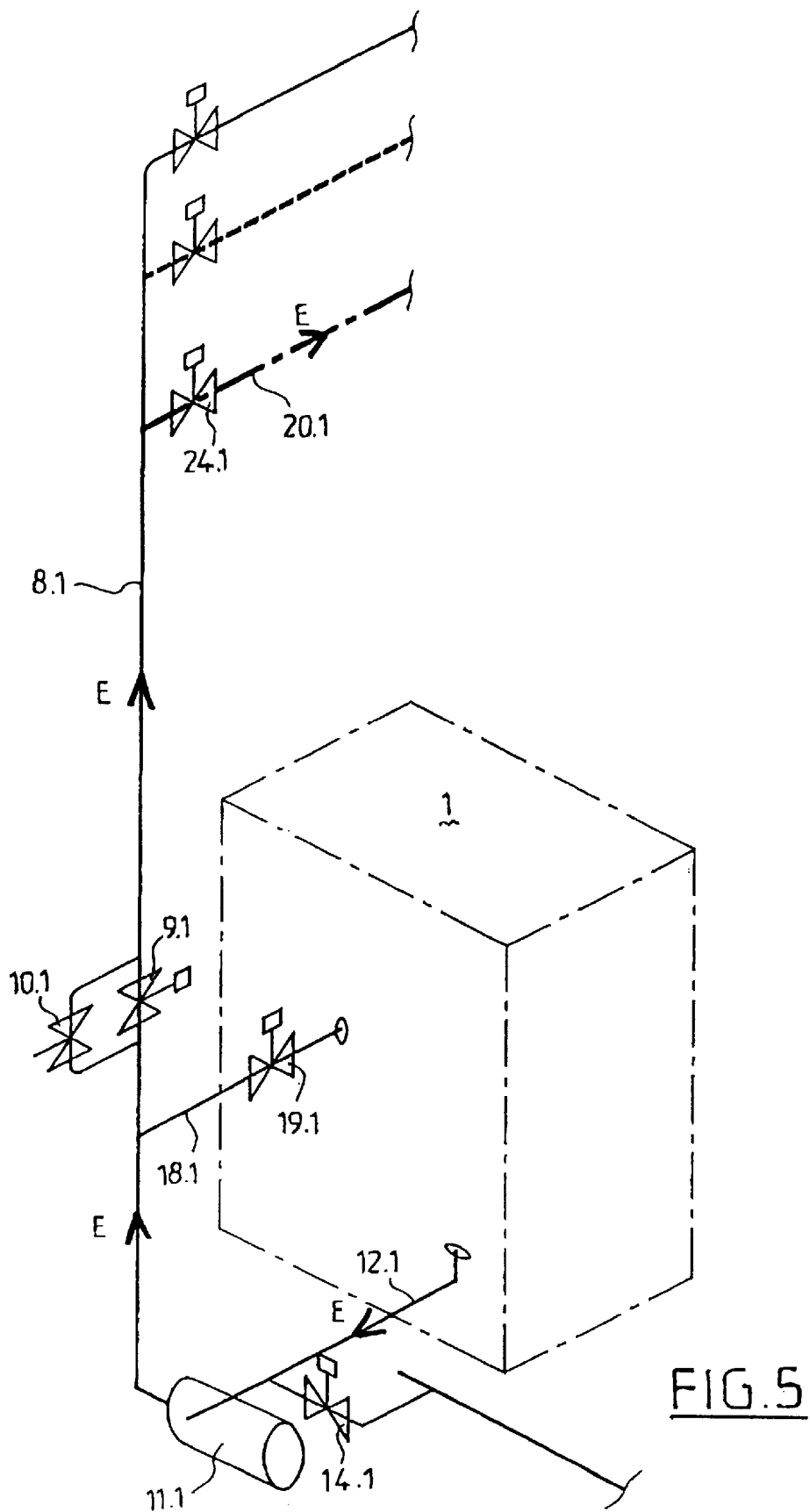
Figure 6:
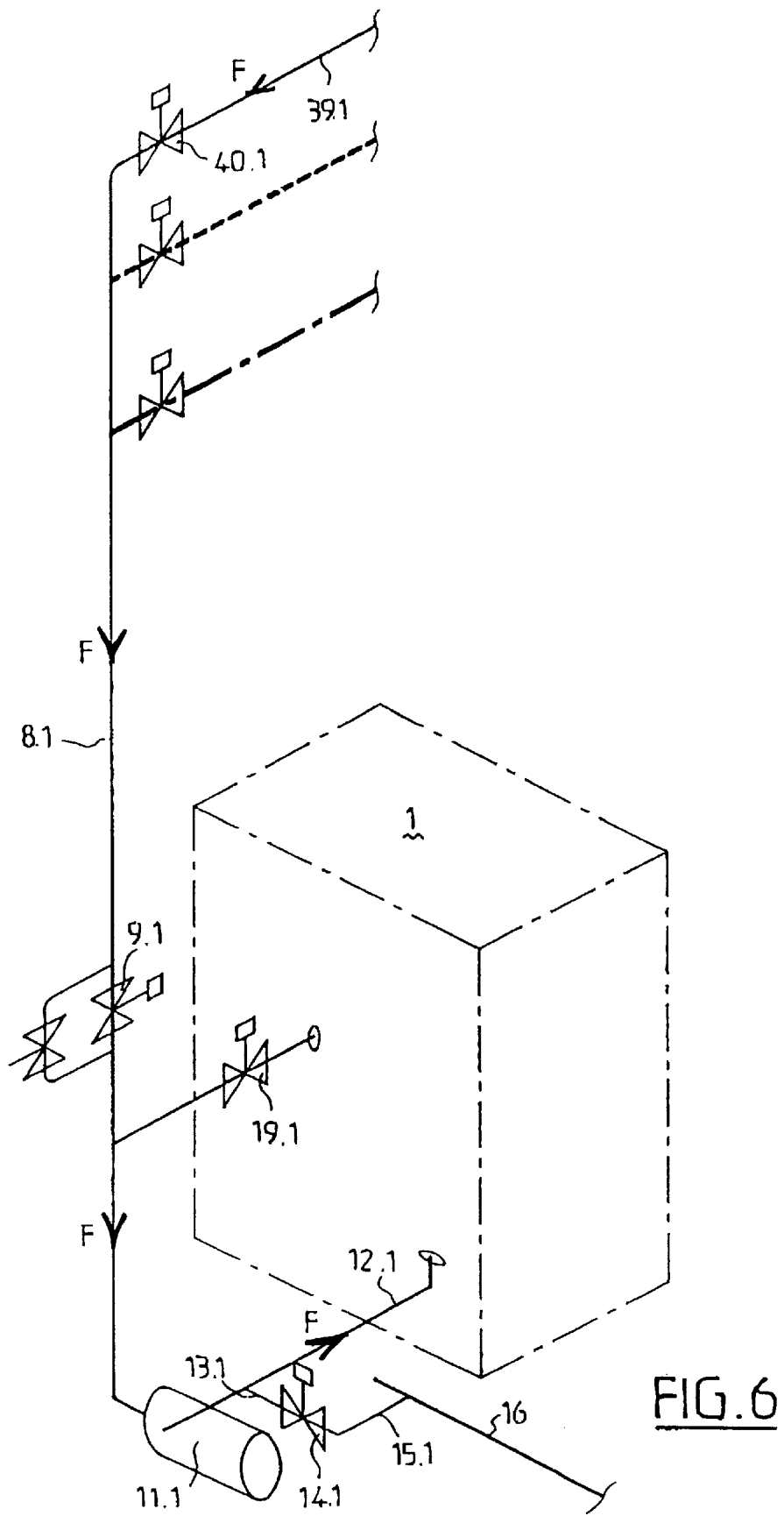
Figure 7:
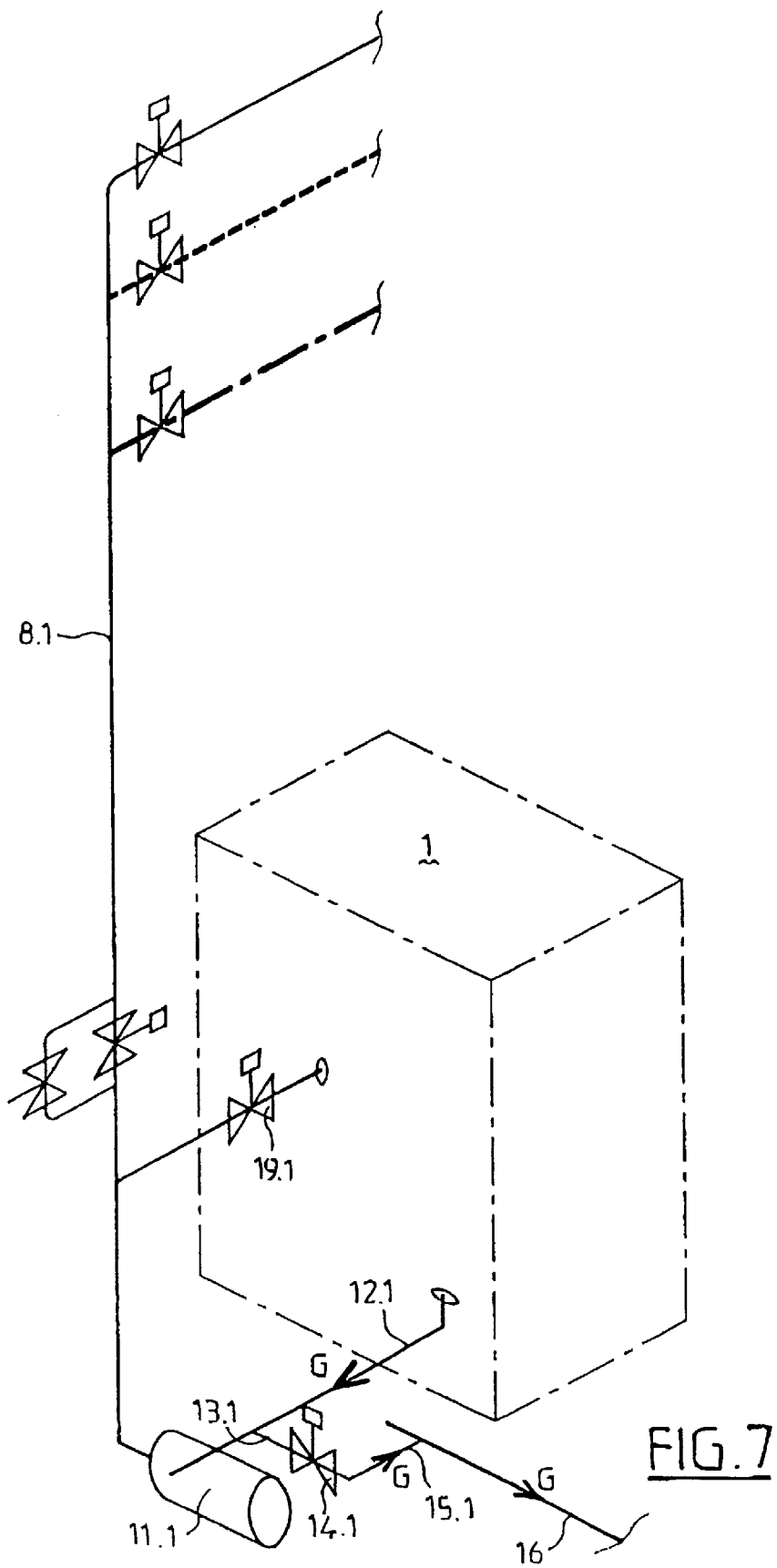
Figure 8:
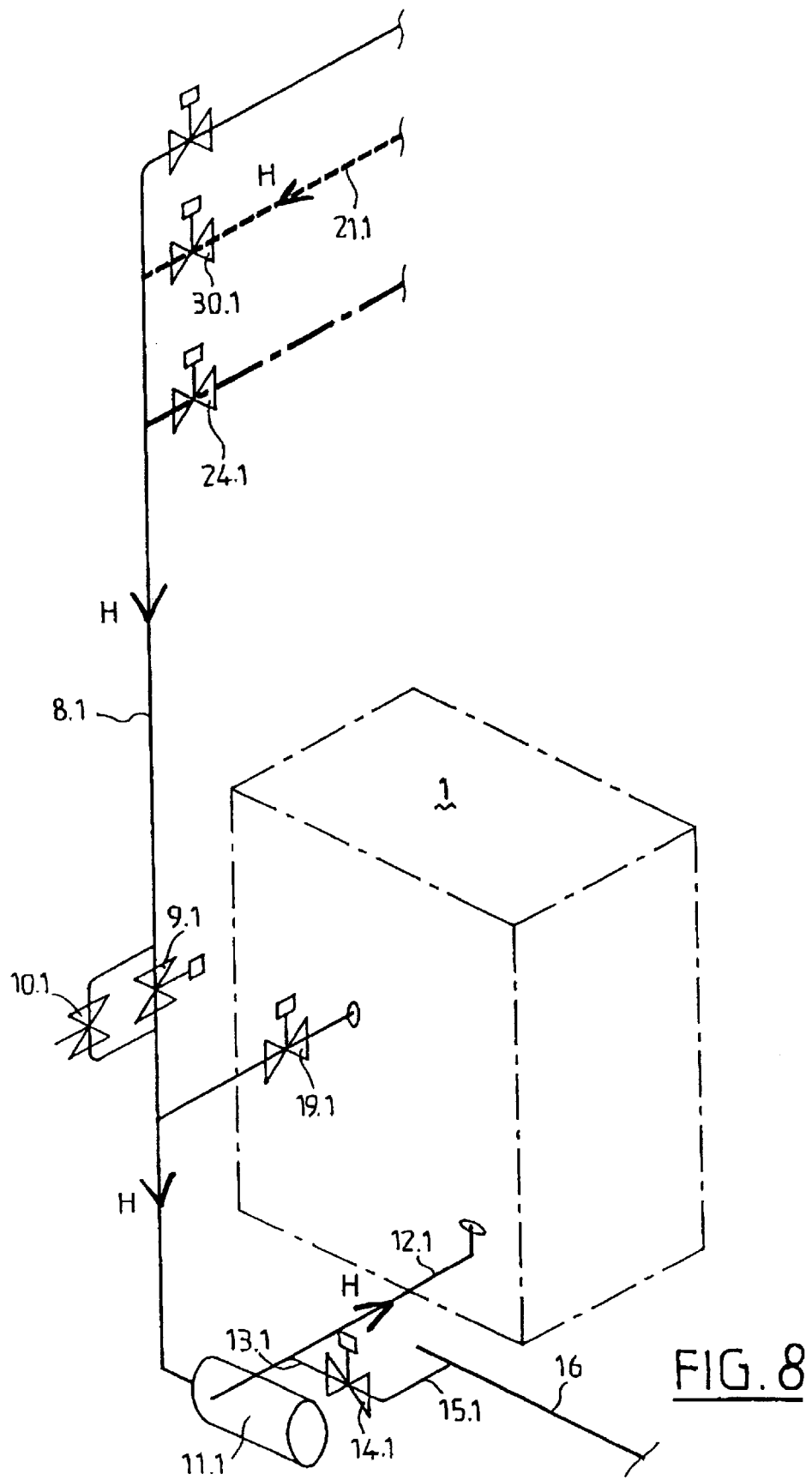
Figure 9:
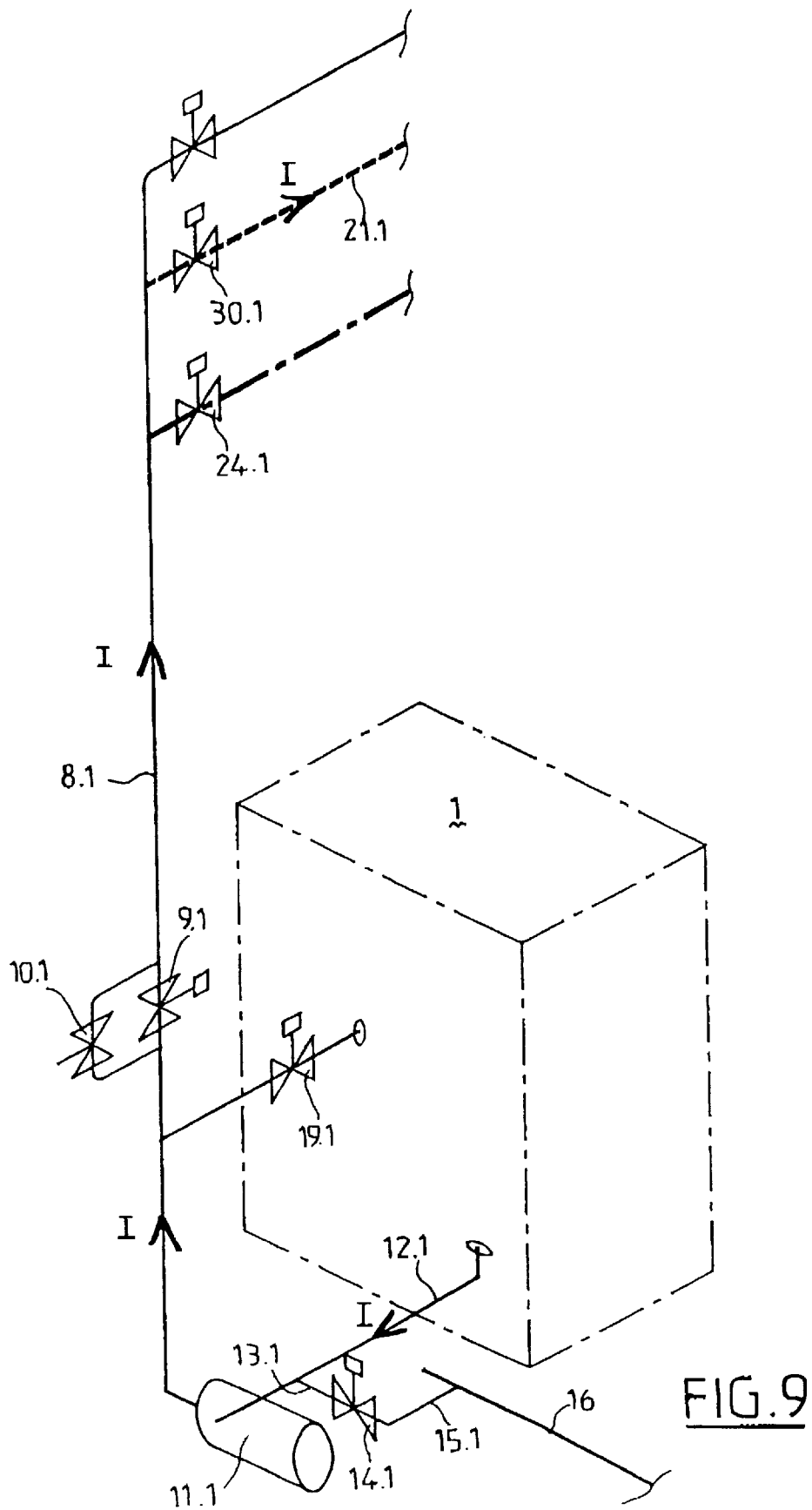

The characteristics of the invention mentioned above, and others, will emerge more clearly from a reading of the following description of an example embodiment, the said description being given in relation to the accompanying drawings, in which:

FIG. 1 is a schematic perspective view of an installation according to the invention, FIG. 2 is a schematic perspective view of part of the said installation illustrating an operating sequence of the said installation, FIG. 3 is a schematic perspective view of the said part illustrating another operating sequence, FIG. 4 is a schematic perspective view of the said part illustrating another operating sequence, FIG. 5 is a schematic perspective view of the said part illustrating another operating sequence, FIG. 6 is a schematic perspective view of the said part illustrating another operating sequence, FIG. 7 is a schematic perspective view of the said part illustrating another operating sequence, FIG. 8 is a schematic perspective view of the said part illustrating another operating sequence, and FIG. 9 is a schematic perspective view of the said part illustrating another operating sequence.

The installation shown in the example of FIG. 1 has four cooking tanks 1 to 4, a heating unit 5, a refrigeration unit 6 and a set of pipes 7 connecting each unit 5, 6 to each of the said tanks 1 to 4.

In this example embodiment, the tanks 1 to 4 and the units 5 and 6 have respectively the forms detailed in the aforementioned document EP-B-334 782, and the said tanks 1 to 4 are also designed to be aligned below the said units 5 and 6.

However, it should be noted that an installation according to the invention is not limited to this example embodiment, and that it could include one or more tanks 1 to 4 provided at the same height as the said units 5 and 6.

According to an essential characteristic of the present invention, the set of pipes 7 includes pipes 8.1 to 8.4, vertical in the said example embodiment, which are respectively associated with the said tanks 1 to 4. Each pipe 8.1 to 8.4 is provided with a solenoid valve 9.1 to 9.4 in its part adjacent to the corresponding tank 1 to 4, and a flow rate adjustment valve 10.1 to 10.4 is mounted in parallel with each solenoid valve 9.1 to 9.4.

Each pipe 8.1 to 8.4 is designed to permit on the one hand the conveying of hot or cold liquid coming from one or other of the units 5 or 6 in the direction of the corresponding tank 1 to 4 in order to fill it and on the other hand the return of the liquid contained the said tank 1 to 4 in the direction of one or other of the said units 5 or 6, by means of a reversible pump 11.1 to 11.4.

Each pump 11.1 to 11.4 is installed so as to connect the corresponding end of the pipe 8.1 to 8.4 to an inlet of the said tank 1 to 4 situated in its bottom part, by means of a pipe 12.1 to 12.4. In the example in FIG. 1, each pipe 12.1 to 12.4 is horizontal and at right angles to the direction of alignment of the tanks 1 to 4, and terminates by being angled upwards in order to communicate with the said inlet.

Reversible pump 11.1 to 11.4 means a pump designed either to suck in or discharge liquid inside each of the two pipes 8.1 to 8.4 and 12.1 to 12.4, which then constitute both a liquid inlet or outlet for the said pump 11.1 to 11.4, depending on the operating mode used for the latter.

In the following, the horizontal direction of alignment of the tanks 1 to 4 will be termed longitudinal and the horizontal direction at right angles to the said alignment will be termed transverse.

Pipes 13.1 to 13.4 provided with solenoid valves 14.1 to 14.4 are respectively mounted at right angles to the said pipes 12.1 to 12.4, and are connected by an elbow 15.1 to 15.4 to a longitudinal pipe 16. The latter is connected to a vertical pipe 17 in the example of FIG. 1 for discharging liquid in the direction of the drains (see arrow A) and is closed at its end 16A opposite to the said pipe 17.

Each pipe 8.1 to 8.4 is connected, in its part adjacent to the corresponding pipe 1 to 4 and below the said solenoid valve 9.1 to 9.4 with reference to FIG. 1, to an outlet of the said tank 1 to 4 situated in its inner top part by means of a transverse pipe 18.1 to 18.4. Each transverse pipe 18.1 to 18.4 is provided with a solenoid valve 19.1 to 19.4. In its part adjacent to the units 4 and 6, each pipe 18.1 to 18.4 is connected to each of the units 5 and 6 by means of two connecting pipes 20.1 to 20.4 and 21.1 to 21.4 respectively.

Each pipe 20.1 to 20.4 has its free end 22.1 to 22.4 connected to the inner bottom part of the heating unit 5, preferably so that the respective free ends 22.1 to 22.4 of the pipes 20.1 to 20.4 are aligned in a transverse direction, on the side 5a of the unit 5 furthest away from the other unit 6.

In the example of FIG. 1, each pipe 20.1 to 20.4 has, as from the corresponding pipe 8.1 to 8.4, a first transverse portion 23.1 to 23.4 provided with a solenoid valve 24.1 to 24.4, a second longitudinal portion 25.1 to 25.4 extending the previous one by means of an elbow to 26.1 to 26.4 towards the aforementioned side Sa of the unit 5, and a third vertical portion 27.1 to 27.4 extending the previous one towards the bottom 5b of the said unit 5 as far as the said end 22.1 to 22.4.

In a similar fashion, each pipe 21.1 to 21.4 has its free end 28.1 to 28.4 connected the inner bottom part of the refrigeration unit 6, preferably so that the respective free ends 28.1 to 28.4 of the pipes 21.1 to 21.4 are aligned in a transverse direction, on the side 6a of the unit 6 furthest away from the other unit 5.

Each pipe 21.1 to 21.4 has a first transverse portion 29.1 to 29.4 provided with a solenoid valve 30.1 to 30.4 and provided for example above the said portion 23.1 to 23.4, a second longitudinal portion 31.1 to 31.4 extending the previous one by means of an elbow 32.1 to 32.4 towards the aforementioned side 6a of the unit 6, and a third portion 33.1 to 33.4 extending the previous one towards the bottom 6b of the said unit 6 as far as the said end 28.1 to 28.4.

In the example of FIG. 1, it will however be noted that the pipe 8.4 relating to the end tank 4 is provided close to the said side 6a of the unit 6. As a result the corresponding pipe 21.4 does not have the said second longitudinal portion 31.4.

With reference to the example of FIG. 1, the two pipes 20.1, 21.1 relating to the other end tank 1 are connected to the same vertical pipe 34, itself connected to the system supplying municipal water at ambient temperature (see arrow B), by means of two longitudinal inlet pipes 35 and 36 respectively. More precisely, the inlet pipes 35 and 36 connect respectively the first portions 23.1, 29.1 of the said pipes 20.1 and 21.1 to the said pipe 34, between the solenoid valves 24.1, 30.1 and the respective elbows 26.1 and 32.1 of the said portions 23.1 and 29.1. In addition, each longitudinal pipe 35, 36 is provided with a solenoid valve 37, 38.

The ends of the pipes 8.1 to 8.4 which are adjacent to the units 5 and 6 are extended respectively by transverse portions 39.1 to 39.4 provided with solenoid valves 40.1 to 40.4. These portions 39.1 to 39.4 are connected to the said vertical pipe 34 supplying municipal water by a common longitudinal pipe 41. The latter is closed at its end adjacent to the said vertical pipe 8.4.

The pipes 20.4 and 21.4, which are provided on the opposite side to the municipal water supply pipe 34, are for their part connected to the said vertical discharge pipe 17 by means of two longitudinal outlet pipes 42 and 43 respectively. More precisely, these outlet pipes 42 and 43 connect respectively the first portions 23.4, 29.4 of the said pipes 20.4 and 21.4 to the said pipe 17, between the solenoid valves 24.4, 30.4 and the respective elbows 26.4 and 32.4 of the said portions 22.1 and 29.1. In addition, each longitudinal pipe 42, 43 is provided with a solenoid valve 44, 45.

It should be noted that each tank 1 to 4 is preferably provided with detectors for high and very high liquid levels, a low level detector and a temperature probe, which are not shown in FIG. 1. The units 5 and 6 for their part are provided with temperature regulation means (not shown).

Finally, a control unit preferably managed by a microprocessor is provided for controlling the solenoid valves 9.1 to 9.4, 10.1 to 10.4, 14.1 to 14.4, 19.1 to 19.4, 24.1 to 24.4, 30.1 to 30.4, 40.1 to 40.4, 37, 38, 44 and 45 and the pumps 11.1 to 11.4, according to data received from the detectors and probes (this control unit is also not depicted for reasons of clarity in FIG. 1).

This installation according to the invention functions as follows.

First of all the units 5 and 6 are filled with municipal water, which circulates through the pipes 34, 35, 20.1 and 22.1 for the unit 5 and through the pipes 34, 36, 21.1 and 28.1 for the unit 6, only the solenoid valves 37 and 38 then being open.

Once the units 5 and 6 are full and running, foodstuffs are introduced, for example vacuum packed, into the tanks 1 to 4.

Then, as illustrated in FIG. 2 for one of the tanks 1 of the installation, only the solenoid valves 24.1 and 9.1 of the pipes 20.1 and 8.1 respectively are opened. It should be noted that the solenoid valves 30.1 and 40.1 relating to refrigerated water and municipal water remain closed. The water heated by the unit 5 then falls under gravity as far as the said inlet of the tank 1, through 22.1, the pipe 20.1, the solenoid valve 24.1, the pipe 8.1 (which then serves as a filling pipe), the solenoid valve 9.1 and the pipe 12.1 (see arrows C).

This is the sequence of filling the tank 1 with hot water.

As illustrated in FIG. 3 for the same tank 1, the solenoid valves 24.1 and 9.1 are then closed, only the solenoid valve 19.1 on the transverse pipe 18.1 is opened, and the reversible pump 11.1 is started up so that its suction inlet and its discharge outlet are respectively connected to the pipes 8.1 and 12.1. Hot water contained in the tank 1 then leaves the latter through the solenoid valve 19.1 and pipe 18.1 via the pump 11.1, and is recycled in the said tank 1 through the pipes 8.1, 12.1 (see arrows D).

This is the sequence of internal circulation of hot water in the tank 1, which is designed to ensure by stirring a good homogenisation of the temperature of the water in the said tank 1.

As illustrated in FIG. 4, where an addition of hot water is necessary in the tank 1, the solenoid valves 24.1 and 10.1 are opened in addition to the aforementioned solenoid valve 19.1, the pump 11.1 being in operation with the same direction of discharge as before. The hot water which is generated in the pipe 20.1 via the unit 5 passes through the solenoid valve 24.1 in order to drop in the pipe 8.1 (arrows C), passing through the reduced flow rate valve 10.1 because of the closure of the solenoid valve 9.1.

Under the action of the pump 11.1, hot water contained in the tank 1 leaves the said outlet with which it is provided through the solenoid valve 19.1 and the pipe 18.1 and is recycled in the said inlet in the aforementioned manner (arrows D), being mixed at the junction point of the pipes 8.1 and 18.1 with the said hot water descending from the unit 5.

The result of this mixing is that the flow rate of water entering the tank 1 is slightly greater than that leaving the said tank 1 during this addition sequence, and hence the required increase in the hot water level in the said tank 1.

As illustrated in FIG. 5, where a reduction in the hot water level is on the other hand necessary in the tank 1, for this purpose the solenoid valves 9.1 and 24.1 are opened, the solenoid valves 10.1 and 19.1 being closed, and the reversible pump 11.1 is started up in the opposite direction, that is to say so that its suction inlet and discharge outlet are respectively connected to the pipes 12.1 and 8.1. As before, it should be noted that the solenoid valves 30.1 and 40.1 relating to refrigerated water and municipal water remain closed.

Under the action of the pump 11.1, hot water leaves the said inlet of the tank 1 through the pipe 12.1 and goes up as far as the heating unit 5 through the pipe 8.1 (which then serves as a return pipe), the solenoid valves 9.1, 24.1 and the pipe 20.1 and 22.1 (see arrows E). This hot water return sequence is ended when the level obtained in the tank 1 is equal to that required for the operation of cooking the foodstuffs which it contains.

When the cooking of foodstuffs in the tank 1 is terminated, the said tank 1 is drained using the sequence which has just been described with reference to FIG. 5 until there is no longer any hot water in the said tank 1.

As illustrated in FIG. 6, a sequence of filling the tank 1 with municipal water at ambient temperature is then effected. To this end, only the solenoid valves 40.1 and 9.1 of the pipes 39.1 and 8.1 respectively are opened. It should be noted that the solenoid valves 24.1 and 30.1 relating to heated water and refrigerated water remain closed. The municipal water then falls under gravity as far as the inlet to the tank 1, through the pipes 34, 41, the solenoid valve 40.1, the pipes 39.1, 8.1, the solenoid valve 9.1 and the pipe 12.1 (see arrows F).

A sequence of internal circulation by recycling of municipal water contained in the tank 1 is then carried out. To this end, the solenoid valves 40.1 and 9.1 are closed, only the solenoid valve 19.1 on the transverse pipe 18.1 is opened, and the reversible pump 11.1 is started up so that its suction inlet and discharge outlet are respectively connected to the pipes 8.1 and 12.1. The municipal water contained in the tank 1 then follows the path described with reference to the aforementioned FIG. 3.

Then, with a view to effecting an addition of municipal water to the tank 1, the same procedure is followed as that indicated with reference to FIG. 6 and, with a view to subsequently reducing the said level of the municipal water in the said tank 1, the following procedure illustrated in FIG. 7 is carried out.

As can be seen in this FIG., only the solenoid valve 14.1 is opened, the others being closed. The municipal water then leaves the inlet of the tank 1 and flows in the direction of the drains through the pipes 12.1, 13.1, the solenoid valve 14.1, and the pipes 15.1, 16 and 17 (see arrows G). This sequence is ended when the level of the municipal water in the tank 1 is equal to that required for a cooling of the foodstuffs which it contains.

At the end of these cooling operations, the tank 1 is drained, in the manner indicated above with reference to the said FIG. 7.

As illustrated in FIG. 8, a sequence of filling the tank 1 with refrigerated water is then carried out. To this end, only the solenoid valves 30.1 and 9.1 on the pipes 39.1 and 8.1 respectively are opened. It should be noted that the solenoid valves 24.1 and 40.1 relating to heated water and refrigerated water remain closed. Refrigerated water then falls under gravity as far as the inlet into the tank 1, through the pipe 21.1, the solenoid valve 30. 1, the pipe 8.1, the solenoid valve 9.1 and the pipe 12.1 (see arrows H).

A sequence of internal circulation by recycling of refrigerated water contained in the tank 1 is then carried out. To this end, the solenoid valves 30.1 and 9.1 are closed, only the solenoid valve 19.1 on the transverse pipe 18.1 is open, and the reversible pump 11.1 is started up so that its suction inlet and discharge outlet are respectively connected to the pipes 8.1 and 12.1. The refrigerated water contained in the tank 1 then follows the path described with reference to the aforementioned FIG. 3.

Then, with a view to effecting an addition of refrigerated water in the tank 1, the same procedure is followed as that indicated with reference to FIG. 8 and, with a view to subsequently reducing the said municipal water level, the same procedure as illustrated in FIG. 9 is followed.

As can be seen in this FIG., only the solenoid valves 9.1, 30.1 are then opened, and the reversible pump 11.1 is started up in the opposite direction, that is to say so that its suction inlet and discharge outlet are respectively connected to the pipes 12.1 and 8.1. As before, it should be noted that the solenoid valves 13.1 and 40.1 relating to refrigerated water and municipal water remain closed.

Under the action of the pump 11.1, the refrigerated water leaves the inlet of the tank 1 through the pipe 12.1 and rises as far as the refrigeration unit 6 through the pipe 8.1, the solenoid valves 9.1, 30.1 and the pipe 21.1 and 28.1 (see arrows I). This refrigerated water return sequence is ended when the level obtained in the tank 1 is equal to that required for the operation of refrigeration of the foodstuffs which it contains.

At the end of these refrigeration operations, the tank 1 is drained, in the manner indicated above with reference to the said FIG. 9.

Because a reversible pump 11.1 to 11.4 is mounted in the aforementioned manner, it should be noted notably that an installation according to the present invention can operate with a single pipe 8.1 to 8.4 for the fall and rise of liquid between each liquid source 5, 6 or 34 and the said tank 1.

As a result the said installation according to the invention has a reduced size.

I claim:

1. Installation for cooking foodstuffs by soaking in a hot liquid followed by a soaking in at least one cold liquid, the said installation comprising at least one cooking tanks each provided with a liquid inlet, a heating unit for obtaining a hot liquid, a refrigeration unit for obtaining a refrigerated liquid, filling pipes for conveying the liquids to respective inlets of the at least one tank, at least one reversible pump for causing the liquids in the at least one tank to flow in the direction of the inlet and for causing liquids to return from the tank inlet, via one of the filling pipes in the direction of said units.

2. Foodstuff cooking installation according to claim 1, of the type where each tank includes a liquid outlet above the inlet, the said outlet being connected to the filling pipe and a corresponding return pipe by a pipe including a solenoid valve.

3. Foodstuff cooking installation according to claim 1, wherein a portion of each filling and return pipe adjacent to the heating and refrigeration units is connected to each of the said units by two connecting pipes, each including a solenoid valve.

4. Foodstuff cooking installation according to claim 3, wherein free ends of the pipes connected to the said heating unit and free ends of the pipes connected to the said refrigeration unit are on the side of the said corresponding unit furthest away from the other unit.

5. Foodstuff cooking installation according to claim 3, wherein a plurality of aligned tanks are included, the two connecting pipes relating to one of the end tanks being connected to the same pipe for supplying liquid at ambient temperature, by means of two inlet pipes, respectively.

6. Foodstuff cooking installation according to claim 5, wherein each inlet pipe connects a connecting pipe to the supply pipe between the corresponding solenoid valve and free end of the connecting pipe for supplying the units.

7. Foodstuff cooking installation according to claim 5, wherein the ends of the said filling and return pipes which are adjacent to the units include solenoid valves connected to the supply pipe by a common pipe.

8. Foodstuff cooking installation according to claim 5, wherein the connecting pipes relating to the other end tank are connected to a discharge pipe by two outlet pipes respectively.

9. Foodstuff cooking installation according to claim 8, wherein each outlet pipe connects a connecting pipe to the discharge pipe between the solenoid valve and the corresponding free end of the connecting pipe.

10. Foodstuff cooking installation according to claim 1, wherein each filling and return pipe includes two solenoid valves mounted in parallel, one of the solenoid valves being of a flow rate regulation type.

11. Foodstuff cooking installation according to claim 1, wherein the heating and refrigeration units are installed at a height appreciably greater than that of each cooking tank.

12. Foodstuff cooking installation according to claim 2, wherein a portion of each filling and return pipe adjacent to the heating and refrigeration units is connected to each of the said units by two connecting pipes, each including a solenoid valve.

13. Foodstuff cooking installation according to claim 4, wherein a plurality of aligned tanks are included, the two connecting pipes relating to one of the end tanks being connected to the same pipe for supplying liquid at ambient temperature, by means of two inlet pipes, respectively.

14. Foodstuff cooking installation according to claim 6, wherein the ends of the said filling and return pipes which are adjacent to the units include solenoid valves connected to the supply pipe by a common pipe.

* * * * *